Patented May 12, 1953

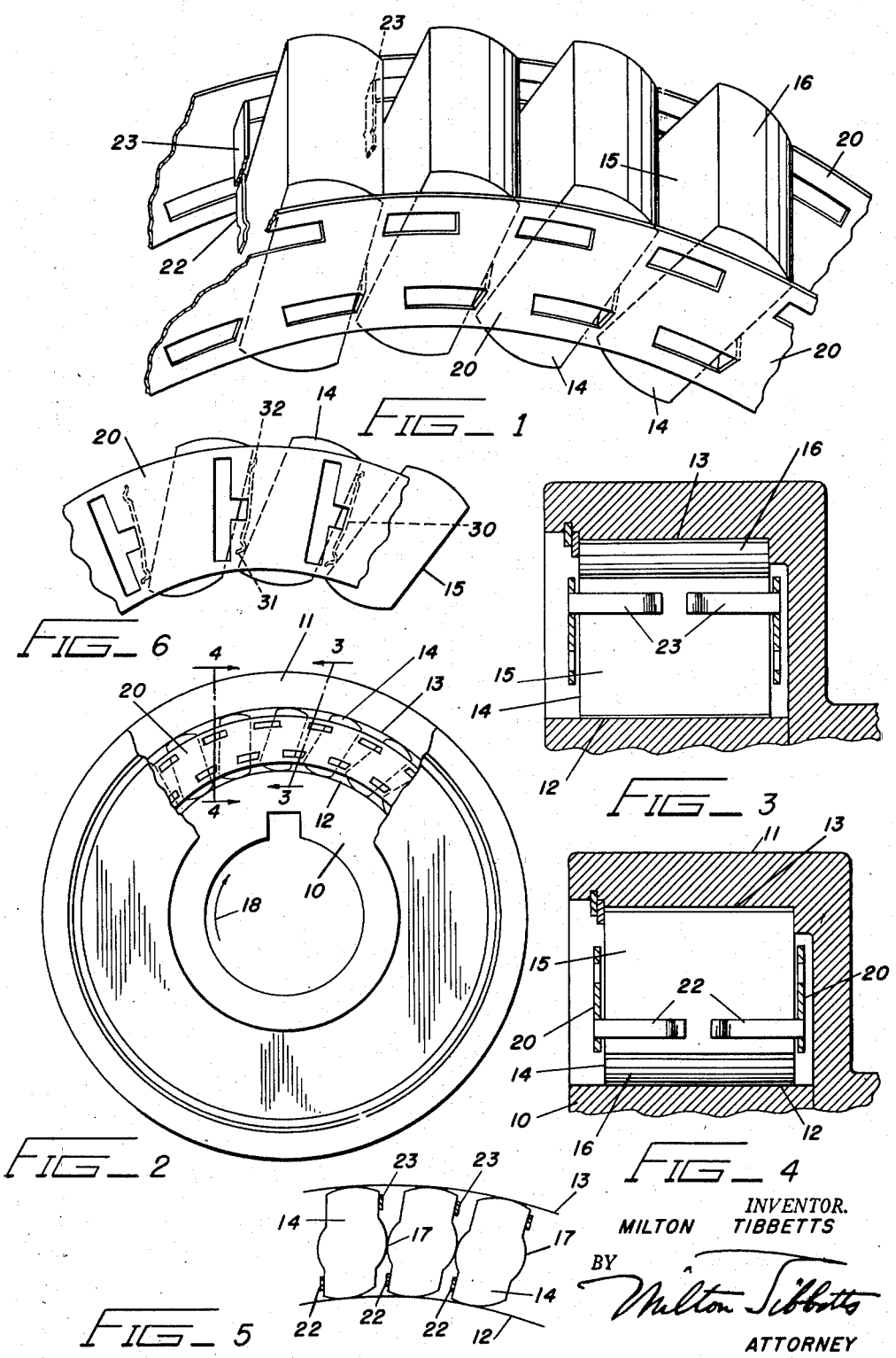

2,638,195

UNITED STATES PATENT OFFICE 2,638,195

SPRAG TYPE CLUTCH

Milton Tibbetts, Detroit, Mich., assignor to Packard Motor Car Company, Detroit, Mich., a corporation of Michigan Application April 19, 1948, Serial No. 22,003

5 Claims. (Cl. 192—45.1)

This invention relates to one-way clutches and particularly to such clutches in which tiltable grippers or sprags are employed between concentric cylindrical surfaces.

One of the objects of the invention is to provide in such clutches a more simple and effective means for yieldably tilting or biasing the grippers towards gripping or clutch engaging position.

Another object of the invention is to provide in such clutches support means with integral fingers for biasing the grippers.

Another object of the invention is to provide in such clutches, a side plate or side plates carrying means for biasing the grippers.

Another object of the invention is to provide a form of biasing means for the grippers of such clutches such that the means may be formed of simple stampings to thereby reduce the cost of such clutches.

Another object of the invention is to provide in such clutches, a means for biasing the sprags without requiring any notches or holes or recesses in the sprags, thereby greatly reducing the cost of the sprags.

Another object of the invention is an arrangement of sprags and biasing means such that an assembly thereof may be easily packaged without fear of their falling apart.

Other objects of the invention will appear from the following description taken in connection with the drawing, which forms a part of this specification, and in which:

Fig. 1 is a fragmentary perspective view showing the grippers or sprags of this invention in conjunction with the means for biasing them;

Fig. 2 is a side elevation of a one-way clutch embodying the invention;

Fig. 3 is an enlarged section substantially on the line 3—3 of Fig. 2;

Fig. 4 is an enlarged section substantially on the line 4—4 of Fig. 2;

Fig. 5 illustrates an alternate form of sprags; and

Fig. 6 illustrates another form of the biasing means.

There are two principal advantages that sprag one-way clutches have over clutches of the roller and incline type; first, the sprags may be arranged closer together than rollers thus providing more sprags in a given annular space and consequently more contacts between driving and driven members, which of course means greater capacity for a given size of clutch, second, the sprag type does not require inclined surfaces on the clutch parts, and third, the sprag type engages with less backlash than the roller type. But sprag type clutches require some sort of means for energizing the sprags, that is, biasing them toward engaging position, which heretofore has resulted either in wide separation of the sprags thus greatly reducing the contact surface, or the notching or drilling of the sprags which greatly increases the cost, or in some cases both.

By the present invention the sprags are left in their more simple form with flat parallel sides permitting close proximity in assembling and arcuate engaging ends extending the full width of the clutch. There are no notches, holes or recesses and consequently this piece of hard steel of which the sprags must be made is easily cut and ground to the desired shape and size and to very close limits. This means a minimum of expense to produce these key parts of the clutch.

In the form of the invention shown, the clutch comprises an inner member 10 and an outer member 11 of larger diameter, these members having concentric cylindrical operating surfaces, the surface marked 12 on the inner member and the spaced surrounding surface marked 13 on the outer member.

Arranged between the concentric cylindrical surfaces is a series of tiltable sprags or grippers 14 of well-known general form having parallel flat sides 15 and arcuate engaging surfaces 16. In some instances the sprags may be formed with arcuate contact surfaces 17 projecting from adjacent side faces as shown in Fig. 5 and in Patents Nos. 1,694,377 and 2,388,424. In neither case do the sprags have any notches, holes or recesses formed in them and they are therefore easy to machine and grind to close limits.

The intended operation of these elements is that, considering the member 10 as the driving element rotating clockwise as shown by the arrow 18, the sprags 14 will engage the surfaces 12 and 13 and clutch and drive the member 11, and the drive will be well distributed around the driving and driven members by reason of the close proximity of the sprags to one another. Should the member 11 tend to run faster than the member 10, the gripping action of the sprags would be loosened and the member 11 would overrun the member 10. This is the usual action of the sprag type overrunning clutch mechanism.

But the engaging operation of the sprags requires that they be biased toward engaging position, and the present invention contemplates means for doing this without mutilating the sprags and without unduly separating them.

On one or both sides of the clutch or, in other words, at one end or both ends of the sprags, a support or plate 20 is provided and this support or plate carries two series of fingers, an inner series marked 22, and an outer series marked 23. These fingers may be formed by stamping them from the plate as shown in the drawing. If but one plate is used, both fingers should extend substantially to the middle portion of the sprags and the inner finger 22 will yieldingly press the inner end of a sprag toward engaging position and the outer finger 23 will yieldingly press the outer end of the adjacent sprag toward its engaging position. In other words, these spring fingers 22, 23 will bias each two adjacent sprags or grippers toward their engaging or clutching position, which biasing however will not interfere with the overrunning action of the outer member 11 relative to the inner member 10.

If supports or side plates 20 are used on both sides of the clutch, as shown in the drawings, the spring fingers will preferably extend toward each other to a point adjacent the middle of the sprags or thereabouts.

In the drawing the spring fingers are shown arranged between each two adjacent sprags but it will be understood that in some cases, particularly where the form of sprags shown in Fig. 5 are used, the biasing means may be arranged between only every other pair of sprags or even less.

It will be noted also that the supports 20 and their integral biasing fingers are, when in assembled or operative position, wholly supported by the sprags.

In Fig. 6 a modified form of spring finger is shown. Here each side plate has an inwardly extending finger portion 30 of T-shape with one prong 31 of the T extending inwardly and the other prong 32 extending outwardly, the inwardly extending prong operating near the radially inner end of one sprag and the other prong operating near the radially outer end of the adjacent sprag.

The construction embodying two support or plate members, one on either side of the clutch, permits of packaging the sprags in desired assembly form for handling or shipping before assembly between the inner and outer members.

It will be understood that various forms of the invention other than those described above may be used without departing from the spirit or scope of the invention.

What is claimed is:

1. A one-way clutch comprising inner and outer members having concentric cylindrical operating surfaces, a series of inclined sprags operatively arranged between said surface, and means at one end of the sprags having members for biasing the sprags toward engaging position, said means and members wholly supported by the sprags when in operative position.

2. A one-way clutch comprising inner and outer members having concentric cylindrical operating surfaces, a series of inclined sprags operatively arranged between said surfaces, and separate plates at the sides of the clutch each having integral spring fingers extending between adjacent sprags for biasing the sprags toward engaging position.

3. A one-way clutch comprising inner and outer members having concentric cylindrical operating surfaces, a series of inclined sprags operatively arranged between said surface, and a plate at one end of the sprags having sprag biasing fingers formed from the plate and extending inwardly between adjacent sprags.

4. A one-way clutch comprising inner and outer members having concentric cylindrical operating surfaces, a series of inclined sprags operatively arranged between said surfaces, and a plate at one end of the sprags having sprag biasing fingers of T-form extending inwardly between and in contact with adjacent sprags.

5. A one-way clutch comprising inner and outer members having concentric cylindrical operating surfaces, a series of inclined sprags operatively arranged between said surfaces, and supports at the sides of the clutch each having spring fingers of T-shape extending between adjacent sprags with the free ends of the fingers in contact with the sprags at inner and outer points.

MILTON TIBBETTS.

References Cited in the file of this patent

UNITED STATES PATENTS

| Number | Name | Date |
| --- | --- | --- |
| 2,154,212 | Moorhouse | Apr. 11, 1939 |
| 2,268,376 | Dodge | Dec. 30, 1941 |
| 2,342,227 | Swenson | Feb. 22, 1944 |
| 2,385,799 | Dodge | Oct. 2, 1945 |
| 2,388,424 | Lund | Nov. 6, 1945 |
| 2,408,962 | Swenson et al. | Oct. 8, 1946 |
| 2,428,962 | Davis | Oct. 14, 1947 |
| 2,453,506 | Gruenberg | Nov. 9, 1948 |

FOREIGN PATENTS

| Number | Country | Date |
| --- | --- | --- |
| 298,673 | Great Britain | Oct. 15, 1928 |